United States Patent
Mitani et al.

(10) Patent No.: US 7,961,035 B2
(45) Date of Patent: Jun. 14, 2011

(54) BOOSTING CIRCUIT

(75) Inventors: Makoto Mitani, Chiba (JP); Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 12/695,464

(22) Filed: Jan. 28, 2010

(65) Prior Publication Data

US 2010/0188137 A1 Jul. 29, 2010

(30) Foreign Application Priority Data

Jan. 29, 2009 (JP) ................................. 2009-018243

(51) Int. Cl.
 *G05F 1/10* (2006.01)
(52) U.S. Cl. ...................................................... 327/536
(58) Field of Classification Search .................. 327/535, 327/536, 537
See application file for complete search history.

(56) References Cited

U.S. PATENT DOCUMENTS

| 6,456,541 B2 * | 9/2002 | Tanzawa ................... 365/189.11 |
| 6,756,837 B2 * | 6/2004 | Kawai et al. ................... 327/536 |
| 7,511,559 B2 * | 3/2009 | Yamahira et al. ............. 327/536 |

FOREIGN PATENT DOCUMENTS

JP 2003-250263 A 9/2003

* cited by examiner

*Primary Examiner* — Jeffrey S Zweizig
(74) *Attorney, Agent, or Firm* — Brinks Hofer Gilson & Lione

(57) ABSTRACT

Provided is a boosting circuit having a small circuit scale. When a node (Vg) is reset by a reset transistor (M3) after a boosting operation has been finished, the reset transistor (M3) is controlled based on a power supply voltage to reset the node (Vg). Therefore, another boosted voltage is not required for the reset, and hence an additional boosting circuit required for the another boosted voltage is unnecessary as well. As a result, the circuit scale of the boosting circuit is reduced correspondingly to the additional boosting circuit.

4 Claims, 4 Drawing Sheets

BOOSTING CIRCUIT

RELATED APPLICATIONS

This application claims priority under 35 U.S.C. §119 to Japanese Patent Application No. 2009-018243 filed on Jan. 29, 2009, the entire content of which is hereby incorporated by reference.

BACKGROUND OF THE INVENTION

1. Field of the Invention

The present invention relates to a boosting circuit, and more specifically, to a boosting circuit for outputting a boosted voltage higher than a power supply voltage from a boost terminal.

2. Description of the Related Art

At present, in a semiconductor device, there may be employed a boosting circuit for outputting a boosted voltage higher than a power supply voltage from a boost terminal. For example, in a non-volatile semiconductor device, the boosting circuit is installed because the boosted voltage is used at the time of writing/erasing into/from a memory cell transistor.

A known example of such boosting circuit is a threshold offset type boosting circuit, which is driven in response to four-phase clock signals to achieve high boost efficiency. This boosting circuit generally includes a plurality of booster cells each of which boosts an input voltage V1 and outputs the boosted input voltage. The boosting circuit includes, for example, four booster cells. Charges are transferred from a boosting capacitor included in the first-stage booster cell into a boosting capacitor included in the second-stage booster cell. Similarly, the charges are transferred from the second-stage booster cell to a third-stage booster cell, and further similarly, the charges are transferred from the third-stage booster cell to a fourth-stage booster cell. As a result, the boosted voltage appears at the boost terminal of the boosting circuit.

Now, a booster cell installed in a conventional boosting circuit is described.

FIG. 6 is a diagram illustrating the conventional booster cell.

If a voltage of a clock terminal CLKS changes to a power supply voltage V2 from a ground voltage, due to the coupling of a capacitor C12, a voltage of a node Vz sufficiently increases to as high as a total voltage (V1+V2) of an input voltage V1 of an input terminal VIN and the power supply voltage V2. Accordingly, a charge transfer transistor M11 is turned ON so that an output voltage of an output terminal VOUT may become the input voltage V1 of the input terminal VIN. Then, charges are stored into a boosting capacitor C11 with the input voltage V1 of the input terminal VIN. On this occasion, because the output terminal VOUT and the input terminal VIN have the equal voltage, a gate voltage and a source voltage of a transistor M12 are equal to each other, and a gate-source voltage of the transistor M12 is lower than its threshold voltage. Accordingly, the transistor M12 is turned OFF.

On the other hand, if a voltage of a clock terminal CLKM changes to the power supply voltage V2 from the ground voltage, due to the coupling of the boosting capacitor C11, the input voltage V1 of the input terminal VIN transferred into the boosting capacitor C11 is boosted at the output terminal VOUT to the total voltage (V1+V2) of the input voltage V1 of the input terminal VIN and the power supply voltage V2. On this occasion, because the output voltage of the output terminal VOUT has increased sufficiently, the transistor M12 is turned ON. Then, the voltage of the node Vz becomes the input voltage V1 of the input terminal VIN. Thus, because the node Vz and the input terminal VIN have the equal voltage, a gate voltage and a source voltage of the charge transfer transistor M11 are equal to each other, and a gate-source voltage of the charge transfer transistor M11 is lower than its threshold voltage. Accordingly, the charge transfer transistor M11 is turned OFF.

On this occasion, a voltage of a reset terminal R is controlled to a predetermined voltage higher than the power supply voltage V2. In addition, a terminal VCC is applied with the power supply voltage V2. In other words, a gate voltage of a transistor M13 becomes the above-mentioned predetermined voltage, and a source voltage thereof becomes the power supply voltage V2. Accordingly, a gate-source voltage of the transistor M13 is higher than its threshold voltage, and hence the transistor M13 is turned ON. The node Vz is discharged from the total voltage (V1+V2) of the input voltage V1 of the input terminal VIN and the power supply voltage V2 to a total voltage of the power supply voltage V2 and a threshold voltage of a transistor M14 (see, for example, JP 2003-250263 A).

In the conventional technology, the predetermined voltage higher than the power supply voltage V2 is used for the reset terminal R at the time of resetting the boosting circuit. Therefore, an additional boosting circuit is required for the reset, which arises a problem that a circuit scale of the boosting circuit is increased correspondingly to the additional boosting circuit.

SUMMARY OF THE INVENTION

The present invention has been made in view of the above-mentioned problem, and has an object to provide a boosting circuit having a small circuit scale.

(1) In order to solve the above-mentioned problem, according to a first aspect of the invention, there is provided a boosting circuit for outputting a boosted voltage higher than a power supply voltage from a boost terminal, the boosting circuit including: at least one booster cell including: an output terminal; a first clock terminal; a second clock terminal; a charge transfer transistor for outputting, while the charge transfer transistor is turned ON, an input voltage from the output terminal as an output voltage of the at least one booster cell; an output voltage boosting capacitor for boosting the output voltage in response to an input of a first clock signal which is sent while the charge transfer transistor is turned OFF, the output voltage boosting capacitor being provided between the output terminal and the first clock terminal; a control transistor for controlling ON/OFF of the charge transfer transistor; a gate voltage boosting capacitor for boosting a gate voltage of the charge transfer transistor in response to an input of a second clock signal so that the charge transfer transistor is turned ON, the gate voltage boosting capacitor being provided between the second clock terminal and a gate of the charge transfer transistor; and a reset transistor for resetting the gate of the charge transfer transistor by being turned ON through application of the power supply voltage to a gate of the reset transistor; and a discharge circuit for discharging the boost terminal after a boosting operation has been finished.

(2) According to a second aspect of the invention, in the boosting circuit according to the first aspect of the invention, when the gate and a source of the reset transistor are respectively applied with the power supply voltage and the boosted voltage, the reset transistor is turned ON so that the gate voltage of the charge transfer transistor, which corresponds to a drain voltage of the reset transistor, is reset to the power supply voltage, and the discharge circuit resets a voltage of the boost terminal to the power supply voltage from the boosted voltage after the boosting operation has been finished.

(3) According to a third aspect of the invention, in the boosting circuit according to the first aspect of the invention, when the gate and a source of the reset transistor are applied with the power supply voltage, the reset transistor is turned ON so that the gate voltage of the charge transfer transistor, which corresponds to a drain voltage of the reset transistor, is reset to the power supply voltage, and the discharge circuit resets a voltage of the boost terminal to the power supply voltage from the boosted voltage after the boosting operation has been finished.

(4) According to a fourth aspect of the invention, in the boosting circuit according to the first, second, or third aspect of the invention, the reset transistor includes a depletion type NMOS transistor.

According to the present invention, the reset transistor for resetting the gate of the charge transfer transistor after the boosting operation has been finished is configured to reset the gate of the charge transfer transistor when turned ON through the application of the power supply voltage to the gate of the reset transistor. Therefore, another boosted voltage is not required for the reset, and hence an additional boosting circuit required for the another boosted voltage is unnecessary as well.

As a result, the circuit scale of the boosting circuit is reduced correspondingly to the additional boosting circuit.

DETAILED DESCRIPTION OF THE PREFERRED EMBODIMENTS

Now, referring to the accompanying drawings, an embodiment of the present invention is described below.

Figure 1:
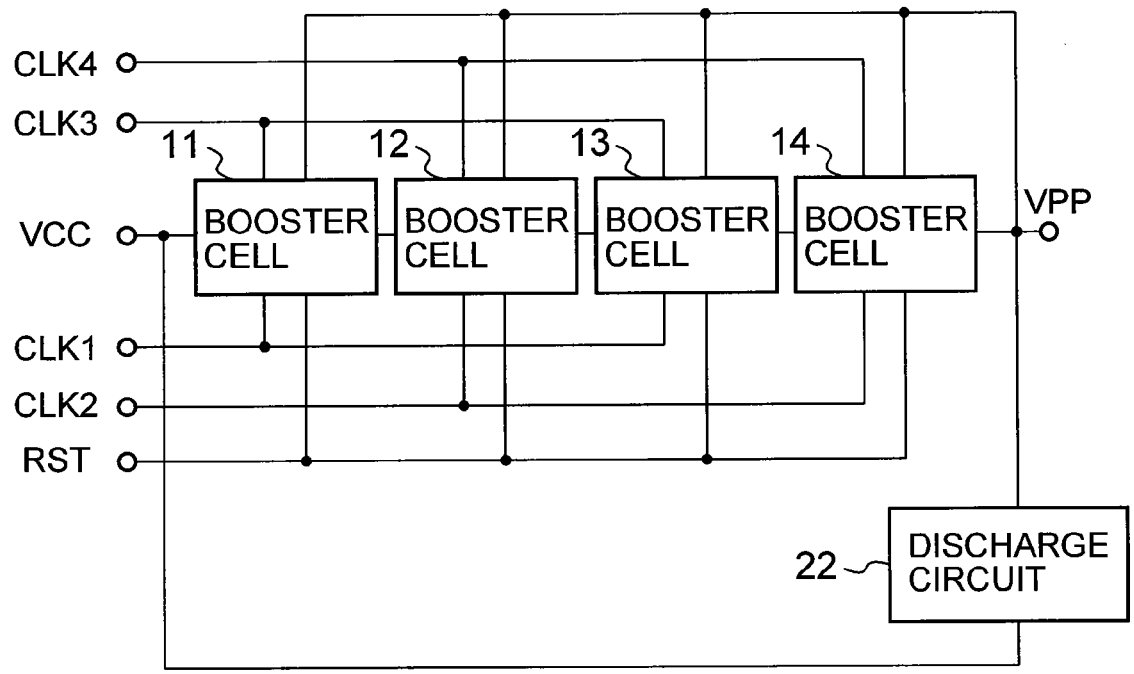
FIG. 1 is a diagram illustrating a boosting circuit according to an embodiment of the present invention.

First, a configuration of a boosting circuit according to the embodiment of the present invention is described. FIG. 1 is a diagram illustrating the boosting circuit.

The boosting circuit includes a power supply terminal VCC, a boost terminal VPP, clock terminals CLK1 to CLK4, and a reset terminal RST. The boosting circuit further includes booster cells 11 to 14 and a discharge circuit 22.

The clock terminal CLK1 is connected to respective internal clock terminals CLK of the booster cell 11 and the booster cell 13. The clock terminal CLK2 is connected to respective internal clock terminals CLK of the booster cell 12 and the booster cell 14.

The clock terminal CLK3 is connected to respective internal clock terminals CLKX of the booster cell 11 and the booster cell 13. The clock terminal CLK4 is connected to respective internal clock terminals CLKX of the booster cell 12 and the booster cell 14.

The boost terminal VPP is connected to respective internal boost terminals VPP of the booster cells 11 to 14.

The reset terminal RST is connected to respective internal reset terminals RST of the booster cells 11 to 14.

The power supply terminal VCC is connected to an input terminal Vi of the booster cell 11. An output terminal Vo of the booster cell 11 is connected to an input terminal Vi of the booster cell 12. An output terminal Vo of the booster cell 12 is connected to an input terminal Vi of the booster cell 13. An output terminal Vo of the booster cell 13 is connected to an input terminal Vi of the booster cell 14. An output terminal Vo of the booster cell 14 is connected to the boost terminal VPP.

The discharge circuit 22 is provided between the output terminal Vo of the booster cell 14 and the power supply terminal VCC.

Each of the booster cells 11 to 14 boosts an input voltage V1 and outputs the boosted input voltage.

The discharge circuit 22 includes, for example, a switch (not shown) provided between the boost terminal VPP and the power supply terminal VCC. After a boosting operation has been finished, the switch is controlled to be turned ON so that the boost terminal VPP and the power supply terminal VCC may be connected to each other. Then, the boost terminal VPP is discharged so that the boosted voltage obtained as a result of sequential boosting performed by the booster cells 11 to 14 may be reset to a power supply voltage V2.

Figure 2:
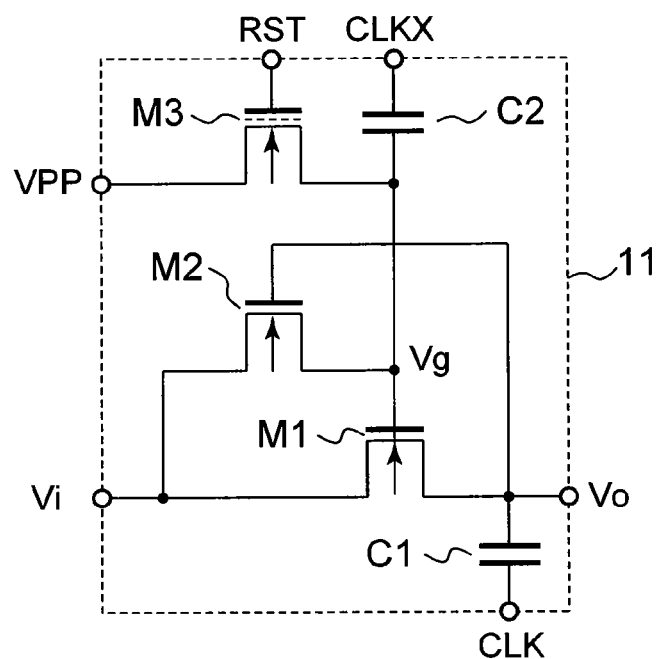
FIG. 2 is a diagram illustrating a booster cell.

Next, a configuration of the booster cell 11 is described. FIG. 2 is a diagram illustrating the booster cell 11.

The booster cell 11 includes a node Vg, the input terminal Vi, the output terminal Vo, the internal clock terminal CLK serving as a first clock terminal, the internal clock terminal CLKX serving as a second clock terminal, the internal reset terminal RST, and the internal boost terminal VPP.

The booster cell 11 further includes an output voltage boosting capacitor C1, a gate voltage boosting capacitor C2, a charge transfer transistor M1, a control transistor M2, and a reset transistor M3.

The charge transfer transistor M1 is provided between the input terminal Vi and the output terminal Vo, and a gate of the charge transfer transistor M1 is connected to the node Vg. The control transistor M2 is provided between the input terminal Vi and the node Vg, and a gate of the control transistor M2 is connected to the output terminal Vo. The output voltage boosting capacitor C1 is provided between the output terminal Vo and the internal clock terminal CLK. The gate voltage boosting capacitor C2 is provided between the internal clock terminal CLKX and the node Vg. The reset transistor M3 is provided between the internal boost terminal VPP and the node Vg, and a gate of the reset transistor M3 is connected to the internal reset terminal RST. Note that respective configurations of the booster cells 12 to 14 are identical with the configuration of the booster cell 11.

The charge transfer transistor M1 outputs the input voltage V1 as an output voltage of the booster cell 11 while the charge transfer transistor M1 is turned ON. When the charge transfer transistor M1 is turned OFF, the output voltage boosting capacitor C1 boosts the output voltage in response to a clock signal from the internal clock terminal CLK. The control transistor M2 controls ON/OFF of the charge transfer transistor M1. The gate voltage boosting capacitor C2 boosts a voltage of the node Vg in response to a clock signal from the internal clock terminal CLKX so that the charge transfer transistor M1 may be turned ON.

A depletion type NMOS transistor is used as the reset transistor M3, which is different from the other enhancement type transistors M1 and M2. After the boosting operation has been finished, the gate and a source of the reset transistor M3 are respectively applied with the power supply voltage V2 and a boosted voltage of the boost terminal VPP, and the reset transistor M3 is turned ON. Then, the node Vg is reset so that the voltage of the node Vg may be reset to the power supply voltage V2. The depletion type NMOS transistor has a negative threshold voltage (−Vtnd), and hence even if its gate-source voltage is, for example, 0 V, this transistor is allowed to be turned ON. Therefore, if the power supply voltage V2 is applied to the gate of the reset transistor M3, the node Vg may be reset.

Next, operations of the boosting circuit are described.

Figure 3:
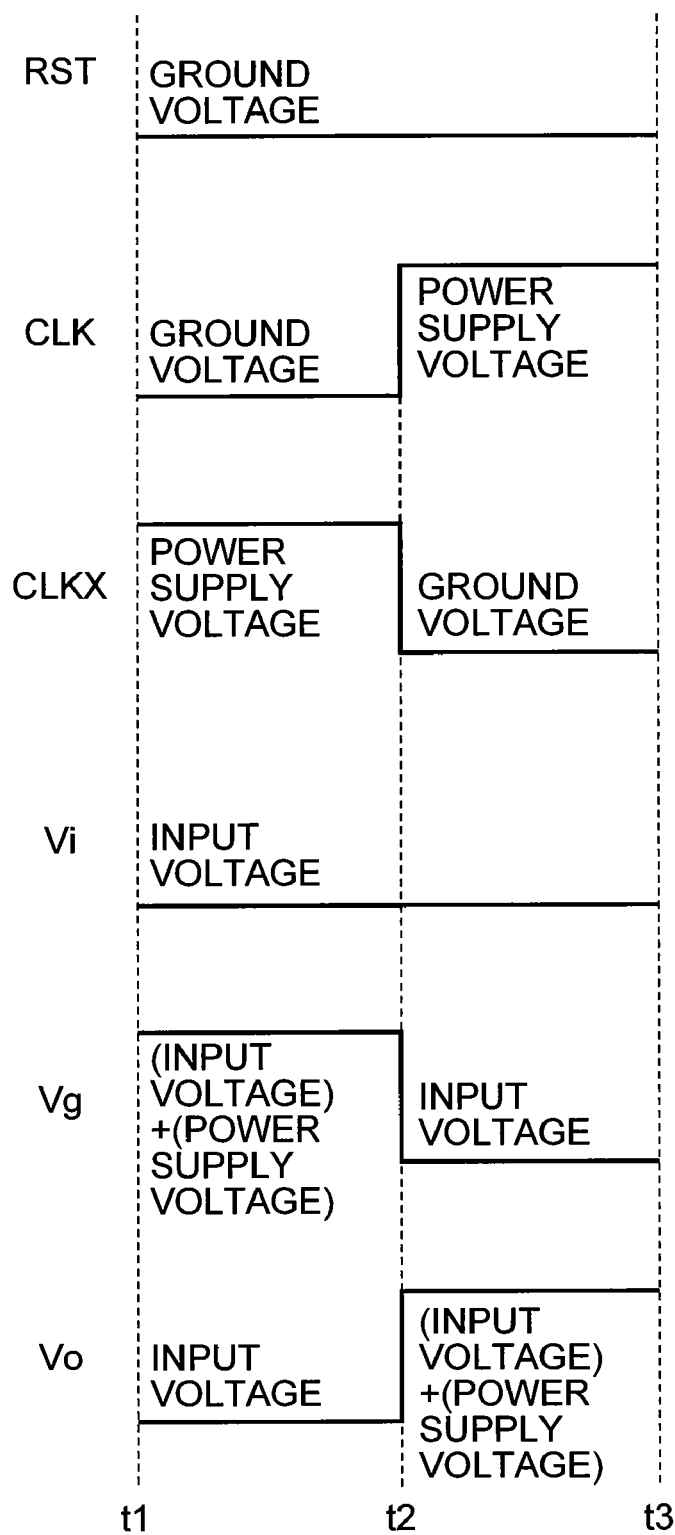
FIG. 3 is a time chart illustrating respective voltages of terminals of the booster cell during a boosting operation.

FIG. 3 is a time chart illustrating respective voltages of the terminals of the booster cell during the boosting operation.

Figure 4:
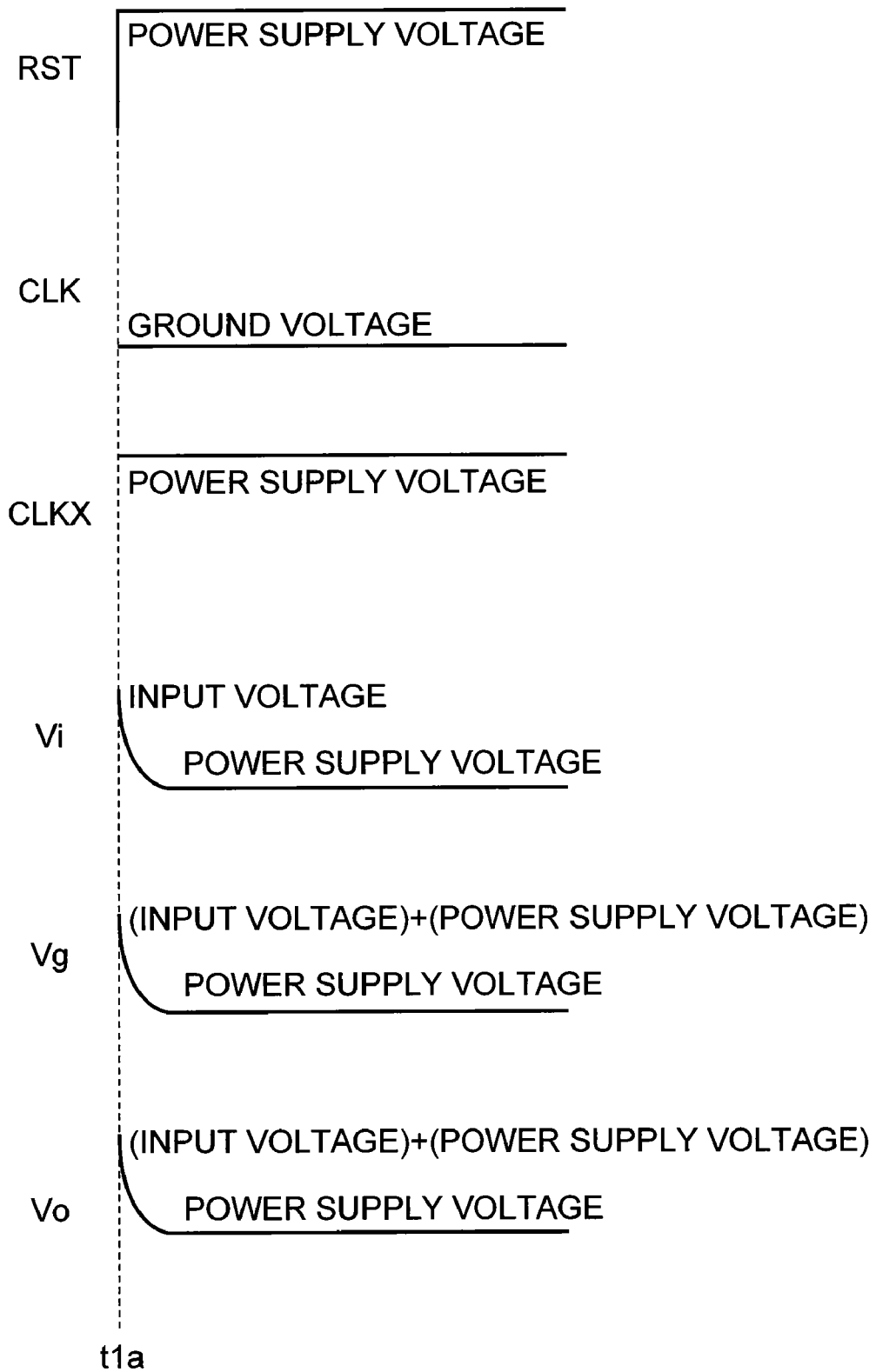
FIG. 4 is a time chart illustrating the respective voltages of the terminals of the booster cell after the boosting operation has been finished.

FIG. 4 is a time chart illustrating the respective voltages of the terminals of the booster cell after the boosting operation has been finished.

Figure 5:
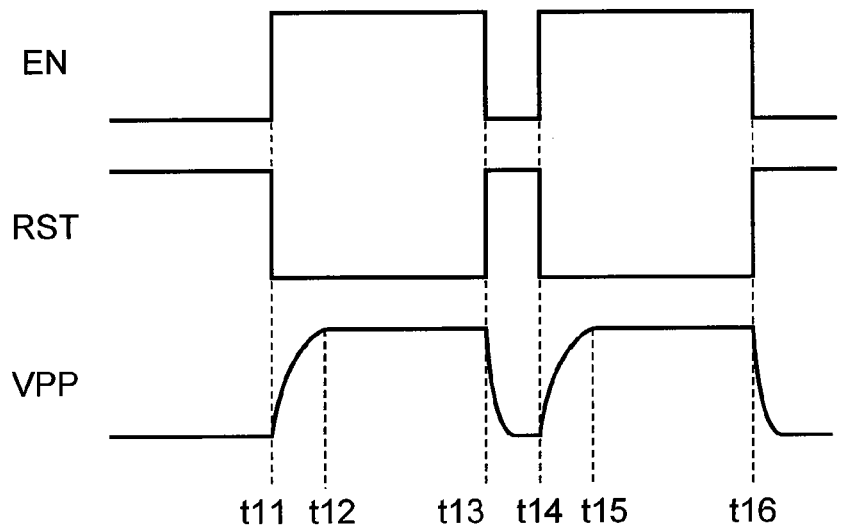
FIG. 5 is a time chart illustrating a boosted voltage.
Figure 6:
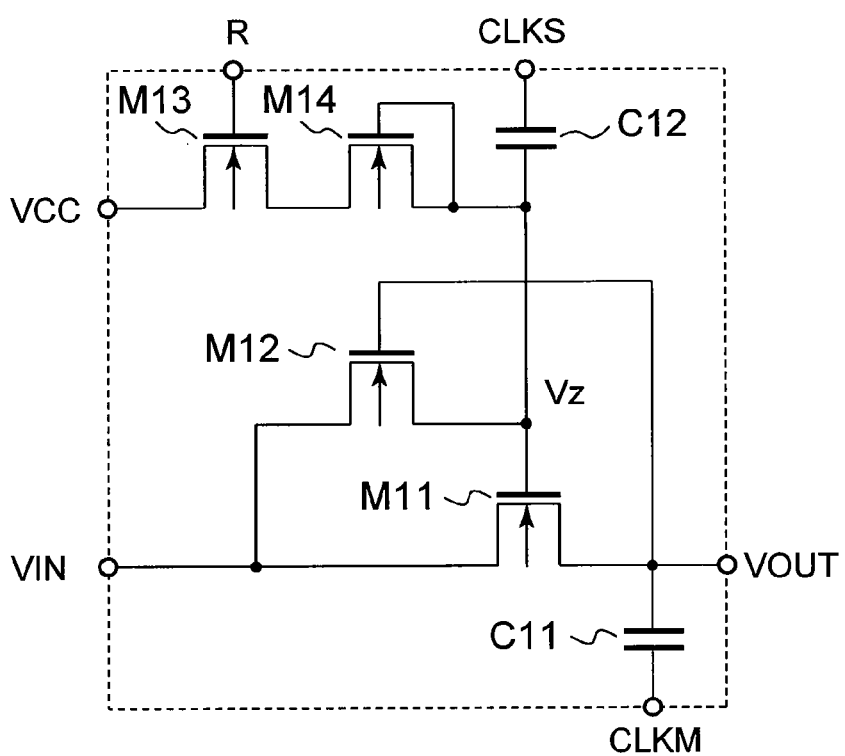
FIG. 6 is a diagram illustrating a conventional booster cell.

FIG. 5 is a time chart illustrating the boosted voltage.

When the boosting circuit performs the boosting operation, the voltage of the internal reset terminal RST is controlled to a ground voltage.

In each of the booster cells, as illustrated in FIG. 3, between times t1 and t2, the voltage of the internal clock terminal CLKX changes to the power supply voltage V2 from the ground voltage. Then, due to the coupling of the gate voltage boosting capacitor C2, the voltage of the node Vg sufficiently increases to as high as a total voltage (V1+V2) of the input voltage V1 of the input terminal Vi and the power supply voltage V2. Accordingly, the charge transfer transistor M1 is turned ON. Because the charge transfer transistor M1 is turned ON, the output voltage of the output terminal Vo becomes the input voltage V1 of the input terminal Vi, and the charges are stored into the output voltage boosting capacitor C1 with the input voltage V1 of the input terminal Vi.

On this occasion, because the output terminal Vo and the input terminal Vi have the equal voltage, a gate voltage and a source voltage of the control transistor M2 are equal to each other, and a gate-source voltage of the control transistor M2 is lower than its threshold voltage. Accordingly, the control transistor M2 is turned OFF. Note that the period between t1 and t2 refers to a charge transfer period.

Subsequently, in each of the booster cells, as illustrated in FIG. 3, between times t2 and t3, the voltage of the internal clock terminal CLK changes to the power supply voltage V2 from the ground voltage. Then, due to the coupling of the output voltage boosting capacitor C1, the input voltage V1 of the input terminal Vi transferred into the output voltage boosting capacitor C1 is boosted at the output terminal Vo to the total voltage (V1+V2) of the input voltage V1 of the input terminal Vi and the power supply voltage V2.

On this occasion, because the output voltage of the output terminal Vo has increased sufficiently, the gate-source voltage of the control transistor M2 becomes higher than its threshold voltage, and accordingly the control transistor M2 is turned ON. Then, the voltage of the node Vg becomes the input voltage V1 of the input terminal Vi. Thus, because the node Vg and the input terminal Vi have the equal voltage, a gate voltage and a source voltage of the charge transfer transistor M1 are equal to each other, and a gate-source voltage of the charge transfer transistor M1 is lower than its threshold voltage. Accordingly, the charge transfer transistor M1 is turned OFF. Note that the period between t2 and t3 refers to a boost period.

Each of the booster cells operates as described above. In the boosting circuit, the booster cells 11 to 14 are controlled based on the respective voltages of the internal clock terminals CLK and CLKX so that the booster cell 11 and the booster cell 13 may operate in one of the charge transfer period and the boost period while the booster cell 12 and the booster cell 14 may operate in the other of the charge transfer period and the boost period, that is, the booster cells 11 and 13 and the booster cells 12 and 14 may operate alternately.

In the boosting circuit, the charges are transferred from the output voltage boosting capacitor C1 included in the first-stage booster cell 11 for boosting the input voltage (power supply voltage) to the output voltage (twice the power supply voltage), into the output voltage boosting capacitor C1 included in the second-stage booster cell 12 for boosting the input voltage (twice the power supply voltage) to the output voltage (three times the power supply voltage). Similarly, the charges are transferred from the second-stage booster cell 12 to the third-stage booster cell 13 for boosting the input voltage (three times the power supply voltage) to the output voltage (four times the power supply voltage). Further similarly, the charges are transferred from the third-stage booster cell 13 to the fourth-stage booster cell 14 for boosting the input voltage (four times the power supply voltage) to the output voltage (five times the power supply voltage). As a result, the boosted voltage higher than the power supply voltage V2 appears at the boost terminal VPP of the boosting circuit.

Note that a load (not shown) is connected to the output terminal Vo of the fourth-stage booster cell 14, and hence the boosted voltage does not reach a desired voltage value immediately. Therefore, the above-mentioned operations during the charge transfer period and the boost period are repeatedly performed in the booster cells for a predetermined number of times so that the boosted voltage may reach the desired voltage value.

In each of the booster cells, as illustrated in FIG. 4, at a time t1a, the voltage of the internal reset terminal RST is controlled to the power supply voltage V2. In addition, the voltage of the internal clock terminal CLK is controlled to the ground voltage, while the voltage of the internal clock terminal CLKX is controlled to the power supply voltage V2.

The discharge circuit 22 starts to discharge the boost terminal VPP to the original power supply voltage V2 from the boosted voltage higher than the power supply voltage V2. Then, after a predetermined first discharge time period has elapsed since the start of the discharge (time t1a), the voltage of the internal boost terminal VPP of each booster cell becomes the power supply voltage V2.

At this time, the voltage of the internal reset terminal RST is controlled to the power supply voltage V2, that is, a gate voltage of the reset transistor M3 is controlled to the power supply voltage V2, and hence the gate-source voltage of the reset transistor M3 is higher than its threshold voltage (−Vtnd). Accordingly, the reset transistor M3 is turned ON. Then, the node Vg, to which a drain of the reset transistor M3 is connected, starts to be discharged to the power supply voltage V2 from the total voltage (V1+V2) of the input voltage V1 of the input terminal Vi and the power supply voltage V2. Then, after a predetermined second discharge time period has elapsed, the voltage of the node Vg becomes the power supply voltage V2.

As described above, the discharge circuit 22 starts to discharge the boost terminal VPP to the original power supply voltage V2 from the boosted voltage higher than the power supply voltage V2. On this occasion, unless the above-mentioned first and second discharge time periods have elapsed, the node Vg of each booster cell is not completely discharged, and hence the voltage of the node Vg is high enough to keep the charge transfer transistor M1 in being turned ON.

Therefore, when the boost terminal VPP is discharged to the power supply voltage V2 from the boosted voltage, the input terminal Vi of each booster cell is also discharged to the power supply voltage V2 from the input voltage V1 of the input terminal Vi. Besides, the output terminal Vo of each booster cell is also discharged to the power supply voltage V2 from the total voltage (V1+V2) of the input voltage V1 of the input terminal Vi and the power supply voltage V2.

As illustrated in FIG. 5, before a time t11, a voltage of an enable terminal EN (not shown) is Low while the voltage of the reset terminal RST is High, and hence the boosting circuit does not perform the boosting operation. Accordingly, the boosted voltage of the boost terminal VPP is controlled to the power supply voltage V2. At the time t11, the voltage of the enable terminal EN becomes High while the voltage of the reset terminal RST becomes Low, and the boosting circuit starts to perform the boosting operation. Then, the boosted voltage starts to increase. Between times t11 and t12, the boosted voltage increases gradually. Between times t12 and t13, the boosted voltage of a desired voltage value appears at the boost terminal VPP.

At the time t13, the voltage of the enable terminal EN becomes Low while the voltage of the reset terminal RST becomes High, and the boosting circuit finishes the boosting operation. Then, the boosted voltage of the boost terminal VPP starts to decrease. Between times t13 and t14, the boosted voltage gradually decreases to the power supply voltage V2. Operations between times t14 to t16 are identical with the above-mentioned operations between the times t11 to t13.

In the boosting circuit, before the boosting operation, the control is made without exception such that the voltage of the enable terminal EN is Low while the voltage of the reset terminal RST is High, to thereby control the boosted voltage of the boost terminal VPP to the power supply voltage V2.

As described above, according to the boosting circuit of this embodiment, the depletion type NMOS transistor is used as the reset transistor M3, and hence when the node Vg is reset by the reset transistor M3 after the boosting operation has been finished, the reset transistor M3 may be controlled based on the power supply voltage V2 to reset the node Vg.

Therefore, another boosted voltage is not required for the reset, and hence an additional boosting circuit required for the another boosted voltage is unnecessary as well. As a result, a circuit scale of the boosting circuit is reduced correspondingly to the additional boosting circuit.

Further, when another boosting operation is performed after the boosting operation has been finished (after the reset), the node Vg has been completely discharged. Therefore, it is possible to eliminate a phenomenon that the boosting operation cannot be performed because the voltage of the node Vg remains high enough to continuously turned ON the charge transfer transistor M1. As a result, the boosting operation may be performed properly.

Still further, before the boosting operation, the voltage of the node Vg of each booster cell and the voltage of the boost terminal VPP are controlled to the power supply voltage V2 without exception, and hence every boosting operation has a substantially invariant period from the start of the boosting operation to a time when the boosted voltage becomes stable and a substantially invariant period during which the boosting operation is stable. Specifically, with regard to the former period, the period between the times t11 and t12 is substantially equal to the period between the times t14 and t15. With regard to the latter period, the period between the times t12 and t13 is substantially equal to the period between the times t15 and t16.

Therefore, for example, in a non-volatile semiconductor device, if the boosted voltage according to this embodiment is used at the time of writing/erasing into/from a memory cell transistor, uniform stress is more likely to be exerted on the memory cell transistor in any boosting. In other words, for example, there is less likely to occur a phenomenon that the writing into the memory cell transistor is deep in one boosting whereas the writing into the memory cell transistor is shallow in another boosting.

Note that the case where the four booster cells are provided in series has been described in the above-mentioned embodiment. However, as long as at least one booster cell is provided, the number of booster cells is arbitrary. The number of booster cells is appropriately selected in accordance with a desired boosted voltage value.

Further, in FIG. 1, the discharge circuit 22 is provided to the output terminal Vo of the booster cell 14, but the discharge circuit 22 may be provided also to the output terminals of the other booster cells. In this case, the respective output terminals of the booster cells are discharged more securely.

Still further, in the embodiment described with reference to FIG. 1, the respective internal boost terminals VPP of the booster cells are connected to the boost terminal VPP of the boosting circuit. The reasons are to prevent the lowering in boost capability due to an OFF-state leakage current of the reset transistor M3 caused during the boosting operation, and prevent the deterioration in reset transistor M3 due to the large voltage difference between the terminals of the reset transistor M3 caused during the boosting operation. Alternatively, although not illustrated, the respective internal boost terminals VPP of the booster cells may be connected to the power supply terminal VCC. In this case, the number of wirings from the boost terminal VPP is reduced, and hence loads on the boost terminal VPP, such as parasitic capacitances, are reduced.

Still further, in the above description, the node Vg is reset immediately after the boosting operation has been finished. Alternatively, although not illustrated, the node Vg may be reset after a predetermined time period has elapsed since the boosting operation has been finished. In this case, the second discharge time period is extended virtually. Therefore, a time period during which the node Vg is not completely discharged is increased to increase a time period during which the voltage of the node Vg is sufficiently high, to thereby increase a time period for turning ON the charge transfer transistor M1. As a result, the respective input terminals Vi and output terminals Vo of the booster cells are discharged more securely.

What is claimed is:

1. A boosting circuit for outputting a boosted voltage higher than a power supply voltage from a boost terminal, the boosting circuit comprising:
    at least one booster cell comprising:
        an output terminal;
        a first clock terminal;
        a second clock terminal;
        a charge transfer transistor for outputting, while the charge transfer transistor is turned ON, an input voltage from the output terminal as an output voltage of the at least one booster cell;
    an output voltage boosting capacitor for boosting the output voltage in response to an input of a first clock signal which is sent while the charge transfer transistor is turned OFF,
    the output voltage boosting capacitor being provided between the output terminal and the first clock terminal;
    a control transistor for controlling ON/OFF of the charge transfer transistor;
    a gate voltage boosting capacitor for boosting a gate voltage of the charge transfer transistor in response to an input of a second clock signal so that the charge transfer transistor is turned ON, the gate voltage boosting capacitor being provided between the second clock terminal and a gate of the charge transfer transistor;

a reset transistor for resetting the gate of the charge transfer transistor by being turned ON through application of the power supply voltage to a gate of the reset transistor; and a discharge circuit for discharging the boost terminal after a boosting operation has been finished, wherein, when the gate and a source of the reset transistor are respectively applied with the power supply voltage and the boosted voltage, the reset transistor is turned ON so that the gate voltage of the charge transfer transistor, which corresponds to a drain voltage of the reset transistor, is reset to the power supply voltage, and wherein the discharge circuit resets a voltage of the boost terminal to the power supply voltage from the boosted voltage after the boosting operation has been finished.

2. A boosting circuit according to claim 1, wherein the reset transistor comprises a depletion type NMOS transistor.

3. A boosting circuit for outputting a boosted voltage higher than a power supply voltage from a boost terminal, the boosting circuit comprising:

at least one booster cell comprising:
an output terminal;
a first clock terminal;
a second clock terminal;
a charge transfer transistor for outputting, while the charge transfer transistor is turned ON, an input voltage from the output terminal as an output voltage of the at least one booster cell;

an output voltage boosting capacitor for boosting the output voltage in response to an input of a first clock signal which is sent while the charge transfer transistor is turned OFF, the output voltage boosting capacitor being provided between the output terminal and the first clock terminal;

a control transistor for controlling ON/OFF of the charge transfer transistor;

a gate voltage boosting capacitor for boosting a gate voltage of the charge transfer transistor in response to an input of a second clock signal so that the charge transfer transistor is turned ON, the gate voltage boosting capacitor being provided between the second clock terminal and a gate of the charge transfer transistor;

a reset transistor for resetting the gate of the charge transfer transistor by being turned ON through application of the power supply voltage to a gate of the reset transistor; and a discharge circuit for discharging the boost terminal after a boosting operation has been finished, wherein, when the gate and a source of the reset transistor are applied with the power supply voltage, the reset transistor is turned ON so that the gate voltage of the charge transfer transistor, which corresponds to a drain voltage of the reset transistor, is reset to the power supply voltage, and wherein the discharge circuit resets a voltage of the boost terminal to the power supply voltage from the boosted voltage after the boosting operation has been finished.

4. A boosting circuit according to claim 3, wherein the reset transistor comprises a depletion type NMOS transistor.

* * * * *